UNITED STATES PATENT OFFICE.

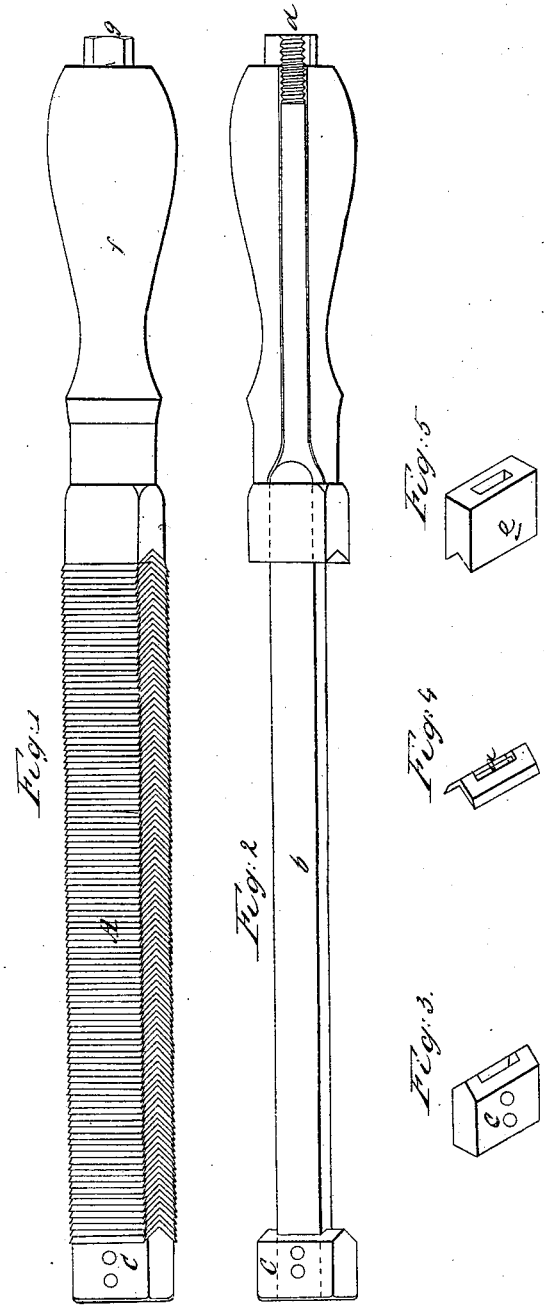

JOSEPH U. HOUSTON, OF WEST MERIDEN, CONNECTICUT.

FILE.

Specification of Letters Patent No. 19,143, dated January 19, 1858.

*To all whom it may concern:*

Be it known that I, JOSEPH U. HOUSTON, of West Meriden, in the county of New Haven, State of Connecticut, have invented a new and useful Improvement in Files; and I do hereby declare that the following is a full and exact description, reference being had to the accompanying drawings, in which—

Figure 1, is a perspective view of the file. Fig. 2, a view of its confining rod, handle nut, and screw. Fig. 3, a perspective view of the point or toe iron. Fig. 4, a perspective view of one of the angular cutters. Fig. 5, a perspective view of the heel iron.

In these drawings, A, denotes a series of angular cutters, each of which is formed of a plate of steel bent angular or concavo convex as shown in Figs. 1, and 4. Each of such cutters is furnished with cutting edges at its opposite sides. It also has a rectangular slot $a$, made through its middle to enable the cutter to be slipped on a rod or bar $b$, which is provided with a toe piece $c$, at one end and a screw $d$, at the other. This bar extends through the heel piece $e$ and the handle, $f$ and receives on its screw a nut, $g$. When the nut is screwed up, the cutters will be drawn closely together, one being caused to enter into that next in rear of it.

By making the cutters concavo convex or angular in the manner described each not only contributes to support the other but has its cutting edges arranged to better advantage for being sharpened, than they would be were the cutters made of unbent or plane pieces of metal, for by loosening the screw nut, the cutters, when borne against a grindstone may be tipped on the rod or bar so as to bring the outer angular faces of their edges down into one plane so as to enable them to be ground while on the rod, it being understood that the slot in each cutter is made so much larger than that part of the rod which is within it as to admit of such taking place.

I do not claim making a file of separate pieces or plates of steel, held together on a rod or bar by means of a screw or its equivalent; nor do I claim making the cutter plates of the file either round or with an angular periphery, but What I do claim is—

An improved file, or an improvement in a file so made, my said improvement consisting in making each of the plates with a concavo convex bend or angle as described and so that one plate shall extend into another and be supported by it, and the whole be arranged to better advantage for being sharpened than is the case, when the plates are plane or unbent pieces of metal.

JOSEPH U. HOUSTON.

Witnesses:
JAMES H. HAYDEN,
W. W. PINKS.